US012797992B2

(12) United States Patent
Sawanishi et al.

(10) Patent No.: US 12,797,992 B2
(45) Date of Patent: Nov. 17, 2026

(54) WELDED JOINT AND PRODUCTION METHOD THEREFOR

(71) Applicant: JFE STEEL CORPORATION, Tokyo (JP)

(72) Inventors: Chikaumi Sawanishi, Tokyo (JP); Katsutoshi Takashima, Tokyo (JP); Kyohei Konishi, Tokyo (JP); Koichi Taniguchi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 18/995,428

(22) PCT Filed: Jul. 31, 2023

(86) PCT No.: PCT/JP2023/028017
§ 371 (c)(1),
(2) Date: Jan. 16, 2025

(87) PCT Pub. No.: WO2024/070192
PCT Pub. Date: Apr. 4, 2024

(65) Prior Publication Data

US 2026/0070145 A1 Mar. 12, 2026

(30) Foreign Application Priority Data

Sep. 28, 2022 (JP) ................................. 2022-155597

(51) Int. Cl.
*B23K 9/16* (2006.01)
*B32B 15/01* (2006.01)
(Continued)

(52) U.S. Cl.
CPC .............. *B23K 9/16* (2013.01); *B32B 15/011* (2013.01); *C22C 38/002* (2013.01); *C22C 38/02* (2013.01);
(Continued)

(58) Field of Classification Search
CPC ..... B32B 15/011; C22C 38/002; C22C 38/02; C22C 38/04; C22C 38/06; C22C 38/14
(Continued)

(56) References Cited

U.S. PATENT DOCUMENTS

2009/0095720 A1* 4/2009 Kamei .................. B23K 28/02 219/121.64
2013/0078031 A1 3/2013 Nakamura et al.
(Continued)

FOREIGN PATENT DOCUMENTS

EP 2567776 A1 3/2013
EP 3670055 A1 6/2020
(Continued)

OTHER PUBLICATIONS

Kostin et al., "Microstructure of Haz Metal of Joints of High-Strength Structural Steel Weldox 1300", The Paton Welding Journal, Mar. 2013 URL: <https://www.researchgate.net/publication/283486310_MICROSTRUCTURE_OF_HAZ_METAL_OF_JOINTS_OF_HIGH-STRENGTH_STRUCTURAL_STEEL_WELDOX_1300>, pp. 6-13 (Year: 2013).*
(Continued)

*Primary Examiner* — Katherine A Christy
(74) *Attorney, Agent, or Firm* — KENJA IP LAW PC

(57) ABSTRACT

A welded joint formed using relatively thin high-strength steel sheets as base metal and having excellent room-temperature toughness. In the welded joint, each base steel sheet has a sheet thickness of 0.8 mm or more and 10 mm or less, at least one of the base steel sheets has a steel microstructure in which a total area ratio of martensite and bainite is more than 50% and a tensile strength of 980 MPa or more, and an oxygen content of a weld metal in a weld portion and a total area ratio of martensite and bainite in the weld metal satisfy a predetermined relationship.

8 Claims, 5 Drawing Sheets

(51) Int. Cl.

| | |
|---|---|
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/14*** | (2006.01) |

(52) U.S. Cl.
CPC .............. *C22C 38/04* (2013.01); *C22C 38/06* (2013.01); *C22C 38/14* (2013.01); *B32B 2250/02* (2013.01); *B32B 2307/7376* (2023.05); *B32B 2311/30* (2013.01)

(58) Field of Classification Search
USPC .......................................................... 428/683
See application file for complete search history.

(56) References Cited

U.S. PATENT DOCUMENTS

| | | | |
|---|---|---|---|
| 2020/0378420 | A1 | 12/2020 | Matsuda et al. |
| 2022/0154319 | A1 | 5/2022 | Otsuka et al. |

FOREIGN PATENT DOCUMENTS

| | | | |
|---|---|---|---|
| JP | 2004001075 | A | 1/2004 |
| WO | 2011037272 | A1 | 3/2011 |
| WO | 2011155620 | A1 | 12/2011 |
| WO | 2018159404 | A1 | 9/2018 |
| WO | 2019035490 | A1 | 2/2019 |
| WO | 2020196869 | A1 | 10/2020 |

OTHER PUBLICATIONS

Oct. 17, 2023, International Search Report issued in the International Patent Application No. PCT/JP2023/028017.

Nov. 12, 2025, the Extended European Search Report issued by the European Patent Office in the corresponding European Patent Application No. 23871435.6.

* cited by examiner

WELDED JOINT AND PRODUCTION METHOD THEREFOR

TECHNICAL FIELD

The present disclosure relates to a welded joint and a production method therefor.

BACKGROUND

In the field of automobiles, the social demand for the reduction of $CO_2$ emissions to prevent global warming and for the improvement of the safety of occupants and pedestrians in the event of a crash (crashworthiness of automobiles) is increasing. An effective way of reducing $CO_2$ emissions during driving is to reduce the weight of the automotive body. For example, reducing the weight of the automotive body by 100 kg can reduce fuel consumption by about 1 km/L on average, with it being possible to reduce $CO_2$ emissions.

On the other hand, standards for crashworthiness of automobiles are becoming stricter every year. It is thus necessary to ensure crashworthiness of automobiles by improving the strength and rigidity of the automotive body and optimizing the distribution of strength. Typically, improving the strength of the automotive body increases the weight of the automotive body and increases $CO_2$ emissions. Hence, it is important to balance crashworthiness of automobiles and reduction in the weight of the automotive body (i.e. reduction in $CO_2$ emissions) by increasing the strength of the materials used in the automotive body. In particular, steel materials such as steel sheets are the main materials that account for about 70% of the automotive weight, and efforts to increase their strength are underway.

For reduction in the weight of the automotive body, that is, for reduction in the weight of the automotive parts, not only the steel sheets used as material but also the weld portions of the welded joints obtained by welding the steel sheets are required to have good strength properties. It is especially important to ensure good strength properties in the weld portions of suspension parts, frame parts, and the like among automotive parts.

As a technique for improving the strength properties of such weld portions, for example, JP 2004-001075 A (PTL 1) discloses the following: "A steel sheet fillet welding method excellent in the fatigue strength of weld portions, wherein steel sheets with a sheet thickness of 1.0 mm to 4.0 mm and a tensile strength of 680 MPa or more are used and a weld metal with a transformation start temperature of 475° C. to 550° C. and a tensile strength of 680 MPa or more is formed in a weld portion of the steel sheets so that the restraint degree of the weld portion will be 4000 N/mm·mm or less and the penetration depth of the weld metal in the weld portion will be ⅓ or less of the sheet thickness of the steel sheets."

WO 2011/155620 A1 (PTL 2) discloses the following: "An ultra high strength welded joint excellent in strength and toughness, comprising a weld metal of martensite single phase and formed using steel sheets with a sheet thickness of 4 mm to 12 mm, wherein in a cross section of the welded joint perpendicular to a welding direction, the weld metal has a cross-sectional shape in which a width W1 of the weld metal at a steel sheet surface layer is 2.0 mm to 7.0 mm and a width W2 of the weld metal at a position of ¾ of the sheet thickness from the steel sheet surface layer is 0.5 mm to 2.4 mm, and the weld metal contains, in mass %, C: more than 0.09% and 0.24% or less, Si: 0.2% to 1.0%, Mn: 0.5% to 2.5%, P: 0.02% or less, S: 0.02% or less, Al: 0.004% to 0.08%, Ti: 0.005% to 0.15%, O: 0.005% to 0.05%, and Ni: 1.0% to 9%, and has a carbon equivalent (Ceq) defined by the following (formula 1) of 0.40% to 1.00% and Y defined by the following (formula 2) of 0.07% to 0.20%, with a balance consisting of inevitable impurities and Fe:

$$Ceq = [C] + [Si]/24 + [Mn]/6 + [Ni]/40 + [Cr]/5 + [Mo]/4 + [V]/14 \quad \text{(formula 1)}$$

$$Y = ([Si] + [Mn])/40 + [Al] + [Ti] \quad \text{(formula 2)}$$

where each element in brackets in (formula 1) and (formula 2) represents the content (mass %) of the element."

CITATION LIST

Patent Literature

PTL 1: JP 2004-001075 A

PTL 2: WO 2011/155620 A1

SUMMARY

Technical Problem

Prevention of brittle fracture is an important factor in the strength properties of weld portions, especially weld portions of welded joints obtained by welding steel plates (hereafter also referred to as weld portions of steel plates). Herein, brittle fracture is a phenomenon that a material fractures directly from slight elastic deformation with substantially no plastic deformation.

From the viewpoint of preventing brittle fracture, efforts have conventionally been made to improve toughness in low-temperature environments such as 0° C. or lower (hereafter also referred to as low-temperature toughness). In detail, a metal material including a weld portion is typically regarded as a ductile material at room temperature. If a metal material, especially a thick metal material, is placed in a low-temperature environment, however, the metal material embrittles and undergoes brittle fracture. Accordingly, efforts have conventionally been made to improve the low-temperature toughness of weld portions of steel plates. In fact, in PTL 2, low-temperature toughness is evaluated based on absorbed energy (vE-40) in a 2 mm V-notch Charpy impact test at −40° C.

However, our study described below revealed that, in welded joints obtained using, as materials to be joined, relatively thin high-strength steel sheets used in automotive parts, for example, steel sheets with a sheet thickness of 0.8 mm or more and 10 mm or less and a tensile strength of 980 MPa or more, particularly in lap fillet welded joints, stress concentrates at a specific part of the weld portion and brittle fracture at around room temperature (hereafter also referred to as room-temperature brittle fracture) is likely to occur.

With the techniques disclosed in PTL 1 and PTL 2, prevention of such room-temperature brittle fracture is not taken into consideration and toughness in the foregoing room-temperature environments (hereafter also referred to as room-temperature toughness) cannot be ensured.

It could therefore be helpful to provide a welded joint formed using relatively thin high-strength steel sheets as base metal and having excellent room-temperature toughness, together with an advantageous production method therefor.

Solution to Problem

Upon careful study, we discovered the following:

(1) Typically, a weld portion of steel plates with a plate thickness of more than 10 mm, particularly more than 20 mm, is unlikely to have room-temperature brittle fracture unless the weld portion embrittles excessively or is subjected to an excessive load exceeding allowable stress.

(2) On the other hand, in the case of a welded joint obtained using steel sheets with a sheet thickness of 0.8 mm or more and 10 mm or less and a tensile strength of 980 MPa or more as materials to be joined, particularly a lap fillet welded joint, even when the tensile stress applied to the weld portion is not more than allowable stress, stress concentrates at a specific part of the weld portion and the risk of room-temperature brittle fracture is high.

(3) For example, when tensile stress is applied to a lap fillet welded joint illustrated in FIG. 1, a large stress concentration occurs at the root. In FIG. 1, reference signs 1 and 2 are steel sheets (base steel sheets), and reference sign 3 is a weld portion (weld metal). When the steel sheets as the materials to be joined have higher strength, the base steel sheets are less likely to fracture (ductile fracture). Consequently, cracks develop from the stress concentration part of the root, and room-temperature brittle fracture occurs inside the weld metal or at the bond (weld interface) which is the boundary between the weld metal and the heat-affected zone (hereafter also referred to as HAZ).

(4) Room-temperature brittle fracture is influenced by various factors in a complicated way and therefore cannot be explained simply, but our study revealed that oxides present in the bond and the weld metal, such as Ti-based oxides, are the initiation point of room-temperature brittle fracture.

(5) The amount of oxides present in the bond and the weld metal correlates with the amount of oxygen contained in the weld metal. By appropriately controlling the relationship between the amount of oxygen contained in the weld metal (hereafter also referred to as the oxygen content of the weld metal) and the total area ratio of martensite and bainite in the weld metal, it is possible to effectively prevent room-temperature brittle fracture even in a weld portion that joins high-strength base steel sheets, for example, base steel sheets containing a large amount of martensite and bainite and having a tensile strength of 980 MPa or more.

The present disclosure is based on these discoveries and further studies.

We thus provide the following.

1. A welded joint comprising: two or more base steel sheets; and a weld portion joining the base steel sheets, wherein each of the base steel sheets has a sheet thickness of 0.8 mm or more and 10 mm or less, at least one of the base steel sheets has a steel microstructure in which a total area ratio of martensite and bainite is more than 50% and a tensile strength of 980 MPa or more, and an oxygen content of a weld metal in the weld portion and a total area ratio of martensite and bainite in the weld metal satisfy the following formulas (1) to (3):

$$10 \le Ow \le 600 \tag{1}$$

$$10-(Ow-10)/34 \le Mw \le 100 \text{ when } 10 \le Ow \le 350 \tag{2}$$

$$0 \le Mw \le 100-(Ow-350)\times 50/250 \text{ when } 350 < Ow \le 600, \tag{3}$$

where Ow is the oxygen content of the weld metal in mass ppm, and Mw is the total area ratio of martensite and bainite in the weld metal in %.

2. The welded joint according to 1., being a lap fillet welded joint.

3. The welded joint according to 1, or 2., wherein each of the base steel sheets has a chemical composition in which a Ti content is 0 mass % to 0.20 mass % and a B content is 0 mass % to 0.0100 mass %.

4. A production method for a welded joint, comprising welding two or more steel sheets as materials to be joined to obtain a welded joint, wherein each of the steel sheets has a sheet thickness of 0.8 mm or more and 10 mm or less, each of the steel sheets has a surface oxide layer thickness of 50 μm or less, at least one of the steel sheets has a steel microstructure in which a total area ratio of martensite and bainite is more than 50% and a tensile strength of 980 MPa or more, a total volume fraction of $CO_2$ and $O_2$ in a shielding gas used for the welding and a Ti content and B content in each of the steel sheets satisfy the following formula (4), and a heat input amount in the welding, a thickness of the materials to be joined, and an average value of surface oxide layer thicknesses of the steel sheets satisfy the following formula 5

$$0 \le \mathrm{Ti}+100\times \mathrm{B} \le 12-Og\times 0.8/100 \tag{4}$$

$$1200\times t_{all}^{1/3}\times\left(1+0.1\times t_0^{1/5}\right) \le Q \le 4000\times t_{all}^{1/3}\times\left(1+0.1\times t_0^{1/5}\right), \tag{5}$$

where Og is the total volume fraction of $CO_2$ and $O_2$ in the shielding gas in %, Ti is the Ti content in each of the steel sheets in mass %, B is the B content in each of the steel sheets in mass %, Q is the heat input amount in J/cm, $t_{all}$ is the thickness of the materials to be joined in mm, and $t_o$ is the average value of the surface oxide layer thicknesses of the steel sheets in μm.

5. The production method for a welded joint according to 4., wherein a filler metal used for the welding is a solid wire.

6. The production method for a welded joint according to 4, or 5., wherein the welding is gas metal arc welding.

Advantageous Effect

It is thus possible to obtain a welded joint formed using relatively thin high-strength steel sheets as base metal and having excellent room-temperature toughness. Such a welded joint can be used in automotive parts such as suspension parts and frame parts to further enhance the safety performance of automobiles while reducing the automotive body weight.

DETAILED DESCRIPTION

Figure 1:
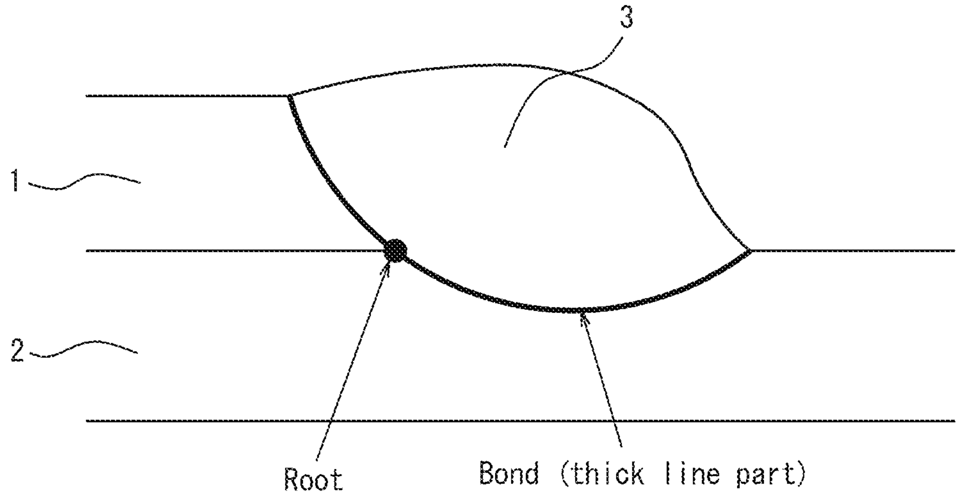
FIG. 1 is a diagram schematically illustrating an example of a cross section of a lap fillet welded joint.

The present disclosure will be described by way of embodiments below. First, a welded joint according to an embodiment of the present disclosure will be described.

[1] Welded Joint

A welded joint according to an embodiment of the present disclosure is a welded joint comprising: two or more base steel sheets; and a weld portion joining the base steel sheets, wherein each of the base steel sheets has a sheet thickness of 0.8 mm or more and 10 mm or less, at least one of the base steel sheets has a steel microstructure in which a total area ratio of martensite and bainite is more than 50% and a tensile strength of 980 MPa or more, and an oxygen content of a weld metal in the weld portion and a total area ratio of martensite and bainite in the weld metal satisfy the following formulas (1) to (3):

$$10 \leq Ow \leq 600 \quad (1)$$

$$10-(Ow-10)/34 \leq Mw \leq 100 \text{ when } 10 \leq Ow \leq 350 \quad (2)$$

$$0 \leq Mw \leq 100-(Ow-350)\times 50/250 \text{ when } 350 < Ow \leq 600, \quad (3)$$

where Ow is the oxygen content (mass ppm) of the weld metal, and Mw is the total area ratio (%) of martensite and bainite in the weld metal.

The welded joint according to an embodiment of the present disclosure will be described in detail below.

[1-1] Base Steel Sheet

The base steel sheets included in the welded joint according to an embodiment of the present disclosure each have a sheet thickness of 0.8 mm or more and 10 mm or less, and at least one of the base steel sheets has a steel microstructure in which the total area ratio of martensite and bainite is more than 50% and a tensile strength of 980 MPa or more, as described above.

Sheet Thickness of Base Steel Sheet: 0.8 mm or More and 10 mm or Less

The sheet thickness of each base steel sheet is 0.8 mm or more and 10 mm or less. In welded joints obtained using steel sheets with a sheet thickness of 0.8 mm or more and 10 mm or less as materials to be joined (hereafter also referred to as welded joints with a sheet thickness of 0.8 mm or more and 10 mm or less), particularly in lap fillet welded joints, stress tends to concentrate at a specific part of the weld portion and the risk of room-temperature brittle fracture is especially high. In other words, improvement in room-temperature toughness is required particularly for welded joints with a sheet thickness of 0.8 mm or more and 10 mm or less. Accordingly, the sheet thickness of each base steel sheet in the present disclosure is 0.8 mm or more and 10 mm or less. The sheet thickness of each base steel sheet is preferably 1.0 mm or more. The sheet thickness of each base steel sheet is preferably 6 mm or less and more preferably less than 4 mm. The sheet thicknesses of the base steel sheets may be the same or different as long as they are within the foregoing range.

Total Area Ratio of Martensite and Bainite: More than 50%

Room-temperature brittle fracture of a weld portion is likely to occur especially in a situation in which base steel sheets are fracture-resistant. If the total area ratio of martensite and bainite in the base steel sheets increases, ductile cracks in the base steel sheets are suppressed. This makes the base steel sheets unlikely to fracture, and increases the possibility of room-temperature brittle fracture of the weld portion. In other words, improvement in room-temperature toughness is required particularly for welded joints formed using such base steel sheets. Therefore, in the steel microstructure of at least one of the base steel sheets, the total area ratio of martensite and bainite is more than 50%. The total area ratio of martensite and bainite in the base steel sheet is preferably 60% or more. No upper limit is placed on the total area ratio of martensite and bainite in the base steel sheet, and the total area ratio of martensite and bainite may be 100%. The area ratio herein is the area ratio to the entire steel microstructure.

The area ratio of the residual microstructures other than martensite and bainite is preferably less than 50% and more preferably 40% or less. The area ratio of the residual microstructures may be 0%. Examples of the residual microstructures include ferrite.

The total area ratio of martensite and bainite is determined as follows. The base steel sheet is cut in the sheet thickness direction, and the cut section is polished and then etched with a 3 mass % nital solution. Following this, any five parts in the region of the cut section other than the heat-affected zone are photographed using a scanning electron microscope (SEM) with 1000 magnification, and the area ratio of each phase is determined by the point counting method. Specifically, lattice points, i.e. points where a plurality of equally-spaced and perpendicular lines intersect, are arranged on each SEM photograph. The ratio of the number of lattice points in the regions identified as martensite and bainite to the total number of lattice points is then taken to be the total area ratio of martensite and bainite. Here, on the SEM photograph, regions with lath-like microstructures are identified as martensite and bainite, and the other regions are identified as residual microstructures. The lattice point interval is 10 μm. The area ratio of the residual microstructures is calculated by subtracting the total area ratio of martensite and bainite from 100

Tensile Strength: 980 MPa or More

When base steel sheets have higher strength, especially when the tensile strength of the base steel sheets is 980 MPa or more, the base steel sheets are less likely to fracture. In addition, the hardening of the weld metal is promoted. This increases the possibility of room-temperature brittle fracture of the weld portion. In other words, improvement in room-temperature toughness is required particularly for welded joints formed using such base steel sheets. Therefore, the tensile strength of at least one of the base steel sheets is 980 MPa or more. The tensile strength of the base steel sheet is preferably 1180 MPa or more. No upper limit is placed on the tensile strength of the base steel sheet, but the tensile strength of the base steel sheet is preferably 2500 MPa or less, for example.

As described above, at least one of the base steel sheets has a steel microstructure in which the total area ratio of martensite and bainite is more than 50% and a tensile strength of 980 MPa or more. The other base steel sheets may or may not have a steel microstructure in which the total area ratio of martensite and bainite is more than 50%. The other base steel sheets may have a tensile strength of 980 MPa or more or less than 980 MPa. However, given that improvement in room-temperature toughness is required more when the total area ratio of martensite and bainite in the base steel sheets is higher and when the strength of the base steel sheets is higher as mentioned above, it is preferable that all base steel sheets including the other base steel sheets have a steel microstructure in which the total area ratio of martensite and bainite is more than 50% and a tensile strength of 980 MPa or more.

Moreover, each of the base steel sheets preferably has a chemical composition in which the Ti content is 0 mass % to 0.20 mass % and the B content is 0 mass % to 0.0100 mass %. Ti-based oxides present in the bond and the weld metal become the initiation point of room-temperature brittle fracture, as mentioned above. Thus, an increase of Ti-based oxides present in the bond and the weld metal makes it difficult to prevent room-temperature brittle fracture. It is therefore preferable that the Ti content is 0.20 mass % or less in the chemical composition of the base steel sheets. No lower limit is placed on the Ti content, and the Ti content may be 0 mass %.

B is an element that improves the quench hardenability of the weld metal and contributes to ensuring the hardness of the weld metal. If the B content is more than 0.0100 mass %, however, the toughness of the weld portion may decrease. In other words, limiting the B content to 0.0100 mass % or less is effective in preventing room-temperature brittle fracture. The B content is therefore preferably 0.0100 mass % or less. No lower limit is placed on the B content, and the B content may be 0 mass %. The B content is preferably 0.0010 mass % or more in order to ensure the quench hardenability of the weld metal without depending on other elements contained in the chemical composition of the base steel sheets.

The chemical composition of the base steel sheets other than Ti and B is not limited. For example, the chemical composition contains, in mass %, C: 0.04% to 0.40%, Si: 0.01% to 2.50%, Mn: 1.00% to 5.00%, P: 0.050% or less, S: 0.010% or less, Ti: 0% to 0.20%, Al: 0.01% to 0.30%, and B: 0% to 0.0100%, and optionally contains, in mass %, one or more elements selected from Cr, Ni, Mo, W, V, Nb, Cu, N, and O in a total amount of 10% or less (in the case where any of these optionally added elements is contained, the total content thereof is preferably 0.1% or more), with the balance consisting of Fe and inevitable impurities.

The base steel sheets may be surface-treated steel sheets having a metal coating layer on the surface of a steel sheet as the base (hereafter also referred to as coated steel sheets). The type and composition of the metal coating layer are not limited. Examples of the metal coating layer include a Zn-based coating layer (a coating layer having a Zn content of more than 50 mass %) and an Al-based coating layer (a coating layer having an Al content of more than 50 mass %). If corrosion resistance is required, a Zn-based coating layer is preferable to an Al-based coating layer. This is because the sacrificial protection effect of Zn in the Zn-based coating layer reduces the corrosion rate of the steel sheet as the base. Examples of the Zn-based coating layer include a hot-dip galvanizing layer (GI), a galvannealing layer (GA), an electrogalvanizing layer (EG), a Zn—Ni-based coating layer (for example, a coating layer containing 10 mass % to 25 mass % of Ni in addition to Zn), a Zn—Al-based coating layer, a Zn—Mg-based coating layer, and a Zn—Al—Mg-based coating layer. Examples of the Al-based coating layer includes an Al—Si-based coating layer (for example, a coating layer containing 10 mass % to 20 mass % of Si in addition to Al).

The coating weight of the metal coating layer in the coated steel sheet is not limited. For example, the coating weight of the metal coating layer is preferably 120 g/m$^2$ or less per side from the viewpoint of weldability. For example, the coating weight of the metal coating layer is preferably 20 g/m$^2$ or more per side from the viewpoint of ensuring rust resistance.

The number of base steel sheets included in the welded joint is two or more. An example of a welded joint formed using three or more base steel sheets is a lap fillet welded joint having three or four overlapping base steel sheets and one weld portion joining the base steel sheets.

[1-2] Weld Portion

The weld portion included in the welded joint according to an embodiment of the present disclosure is the part that joins the base steel sheets, and includes a weld metal, as described above. It is important that the oxygen content of the weld metal in the weld portion and the total area ratio of martensite and bainite in the weld metal satisfy the following formulas (1) to (3):

$$10 \le Ow \le 600 \quad (1)$$

$$10-(Ow-10)/34 \le Mw \le 100 \text{ when } 10 \le Ow \le 350 \quad (2)$$

$$0 \le Mw \le 100-(Ow-350)\times 50/250 \text{ when } 350 < Ow \le 600, \quad (3)$$

where Ow is the oxygen content (mass ppm) of the weld metal, and Mw is the total area ratio (%) of martensite and bainite in the weld metal.

$$10 \le Ow \le 600 \quad (1)$$

If Ow, i.e. the oxygen content of the weld metal, is more than 600 mass ppm, large amounts of oxides such as Ti-based oxides are present in the bond and the weld metal, making it difficult to prevent room-temperature brittle fracture. Limiting Ow to less than 10 mass ppm is impractical because it is necessary to significantly reduce the amount of oxygen in the filler metal (weld wire) and shielding gas used for welding in addition to the base steel sheets. Accordingly, Ow is set to satisfy formula (1). Ow is preferably 400 mass ppm or less. It is more preferable to control Ow depending on the sheet thickness of the base steel sheets, specifically, set Ow to less than or equal to 600−(t−0.8)×1500/92, where t is the sheet thickness (mm) of the thinnest base steel sheet of the base steel sheets.

$$10-(Ow-10)/34 \le Mw \le 100 \text{ when } 10 \le Ow \le 350 \quad (2)$$

$$0 \le Mw \le 100-(Ow-350)\times 50/250 \text{ when } 350 < Ow \le 600 \quad (3)$$

In order to prevent room-temperature brittle fracture of the weld portion, it is necessary to appropriately control the relationship between the oxygen content of the weld metal and Mw, which is the total area ratio of martensite and bainite in the weld metal, depending on Ow as mentioned above.

In detail, when Mw is larger, especially when both Ow and Mw are larger, room-temperature brittle fracture is more likely to occur. Accordingly, when 350<Ow≤600, Mw needs to be less than or equal to 100−(Ow−350)×50/250. When 10≤Ow≤350, no upper limit is placed on Mw, and Mw is 100 or less.

If Mw is excessively small when Ow is small, the weld metal is soft and it is difficult to ensure a certain joint strength. Accordingly, when 10≤Ow≤350, Mw is set to greater than or equal to 10−(Ow−10)/34. When 350<Ow≤600, no lower limit is placed on Mw, and Mw may be 0 or more.

Figure 2:
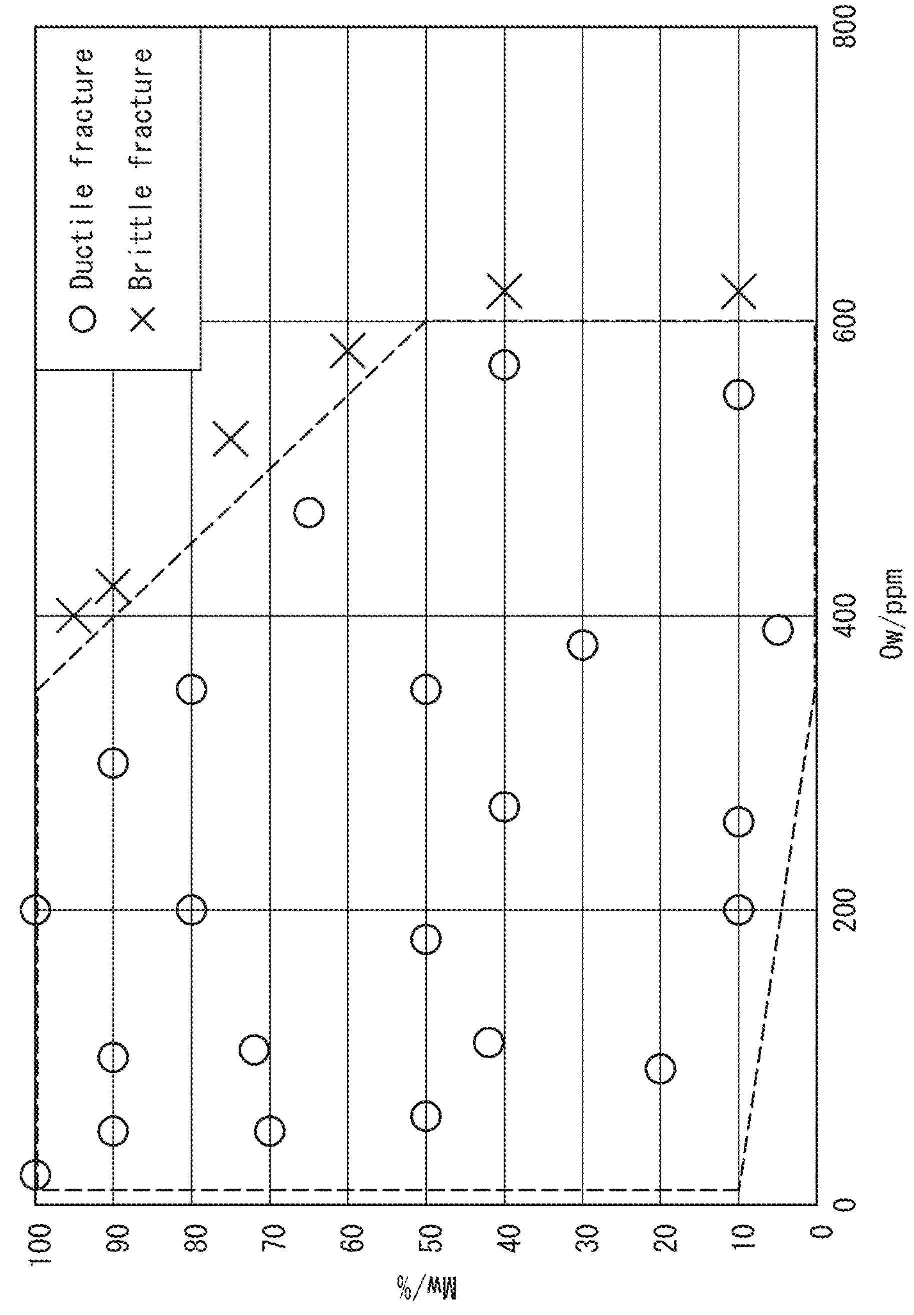
FIG. 2 is a diagram illustrating the results of determining the fracture form in a tensile test for various welded joints.

FIG. 2 illustrates the results of conducting a tensile test in the same manner as in the EXAMPLES section below on various welded joints produced using various steel sheets under various welding conditions (weld wire, shielding gas, and joint type) and determining their fracture forms. In FIG. 2, the horizontal axis represents Ow and the vertical axis represents Mw. Moreover, ○ indicates that the fracture form in the tensile test is ductile fracture, i.e. room-temperature toughness is excellent, and x indicates that the fracture form in the tensile test is brittle fracture, i.e. room-temperature toughness is insufficient. The range in which formulas (1) to (3) are satisfied is enclosed by the dotted line. As can be seen from FIG. 2, room-temperature toughness is excellent in the range in which formulas (1) to (3) are satisfied (i.e. the region enclosed by the dotted line), and insufficient in the range in which at least one of formulas (1) to (3) is not satisfied (i.e. outside the region enclosed by the dotted line).

In particular, it is preferable to satisfy the following conditions:

Ow is 400 mass ppm or less, the foregoing formula (2) is satisfied when 10≤Ow≤350, and Mw is less than or equal to 100−(Ow−350)×0.4 when 350<Ow≤400.

In lap fillet welding, when Ow is larger and the sheet thickness of the base steel sheets is greater, the rigidity of the weld portion against rotational deformation is higher. In such a case, stress concentration at the root tends to increase. It is therefore desirable to more strictly control Mw depending on the sheet thickness of the base steel sheets when Ow is large, that is, when 350<Ow≤600. Specifically, it is preferable to satisfy the following formula (3)':

$$0 \le Mw \le 100 - (Ow - 350) \times \{1 + (t - 0.8)/46\} \times 50/250 \quad (3)'$$

where t is the sheet thickness (mm) of the thinnest base steel sheet of the base steel sheets.

Here, Ow can be determined by the inert gas fusion infrared absorption method. Mw can be determined as follows. The weld portion included in the welded joint is cut in the sheet thickness direction, and the cut section is polished and then etched with a 3 mass % nital solution. Following this, any five parts of the cut section of the weld portion are photographed using a scanning electron microscope (SEM) with 1000 magnification, and the area ratio of each phase is determined by the point counting method. Specifically, lattice points, i.e. points where a plurality of equally-spaced and perpendicular lines intersect, are arranged on each SEM photograph. The ratio of the number of lattice points in the regions identified as martensite and bainite to the total number of lattice points is then taken to be the total area ratio of martensite and bainite. Here, on the SEM photograph, regions with lath-like microstructures are identified as martensite and bainite, and the other regions are identified as residual microstructures. The lattice point interval is 10 μm. The area ratio of the residual microstructures can be calculated by subtracting the total area ratio of martensite and bainite from 100%.

The chemical composition of the weld metal is not limited. For example, the chemical composition contains, in mass %, C: 0.03% to 0.30%, Si: 0.01% to 2.50%, Mn: 0.80% to 5.00%, P: 0.050% or less, S: 0.010% or less, Ti: 0% to 0.2%, Al: 0.001% to 0.30%, B: 0% to 0.0100%, and O: 0.001% to 0.06%, and optionally contains, in mass %, one or more elements selected from Cr, Ni, Mo, W, V, Nb, Cu, and N in a total amount of 10% or less (in the case where any of these optionally added elements is contained, the total content thereof is preferably 0.01% or more), with the balance consisting of Fe and inevitable impurities.

The joint type is not limited, and examples include lap fillet welded joints and butt welded joints. In particular, lap fillet welded joints are preferable.

[2] Production Method for Welded Joint

A production method for a welded joint according to an embodiment of the present disclosure is a production method for a welded joint, comprising welding two or more steel sheets as materials to be joined to obtain a welded joint, wherein each of the steel sheets has a sheet thickness of 0.8 mm or more and 10 mm or less, each of the steel sheets has a surface oxide layer thickness of 50 μm or less, at least one of the steel sheets has a steel microstructure in which a total area ratio of martensite and bainite is more than 50% and a tensile strength of 980 MPa or more, a total volume fraction of $CO_2$ and $O_2$ in a shielding gas used for the welding and a Ti content and B content in each of the steel sheets satisfy the following formula (4), and a heat input amount in the welding, a thickness of the materials to be joined, and an average value of surface oxide layer thicknesses of the steel sheets satisfy the following formula (5), $$0 \le \mathrm{Ti} + 100 \times \mathrm{B} \le 12 - Og \times 0.8/100 \quad (4)$$

$$1200 \times t_{all}^{1/3} \times (1 + 0.1 \times t_0^{1/5}) \le Q \le 4000 \times t_{all}^{1/3} \times (1 + 0.1 \times t_0^{1/5}), \quad (5)$$

where Og is the total volume fraction (%) of $CO_2$ and $O_2$ in the shielding gas, Ti is the Ti content (mass %) in each of the steel sheets, B is the B content (mass %) in each of the steel sheets, Q is the heat input amount (J/cm), $t_{all}$ is the thickness (mm) of the materials to be joined, and $t_o$ is the average value (μm) of the surface oxide layer thicknesses of the steel sheets.

The production method for a welded joint according to an embodiment of the present disclosure will be described in detail below. Since the description of the sheet thickness, steel microstructure, chemical composition, etc. of the base steel sheets in [1-1] above also applies to the sheet thickness, steel microstructure, chemical composition, etc. of the steel sheets as materials to be joined, their description is omitted here.

Surface Oxide Layer Thickness of Steel Sheet: 50 μm or Less

The surface oxide layer of each of the steel sheets as the materials to be joined melts during welding and is incorporated into the weld metal. This causes an increase of Ow, i.e. the oxygen content of the weld metal. Hence, the surface oxide layer thickness of the steel sheet is 50 μm or less. The surface oxide layer thickness of the steel sheet is more preferably 30 μm or less and further preferably 10 μm or less. No lower limit is placed on the surface oxide layer thickness. However, given that, even if the steel sheet is pickled to remove the oxide layer, a natural oxide layer of about 0.001 μm forms, the surface oxide layer thickness of the steel sheet is preferably 0.001 μm or more. Herein, the surface oxide layer thickness of the steel sheet is per side.

Herein, the surface oxide layer of the steel sheet is an oxide layer formed on the surface of the steel sheet. In detail, the surface oxide layer of the steel sheet is a layer formed as a result of iron and/or other metal elements being oxidized on the surface of the steel sheet. The surface oxide layer thickness (i.e. the thickness of the surface oxide layer) of the steel sheet can be measured according to a conventional method. For example, a cross section of the steel sheet is mirror-polished and then observed using a field-emission scanning electron microscope (FE-SEM) to measure the surface oxide layer thickness of the steel sheet. In the case where the surface oxide layer of the steel sheet is very thin due to pickling or the like, the surface layer of the steel sheet may be observed using a transmission electron microscope (TEM) to measure the surface oxide layer thickness of the steel sheet. For example, the average value of the thickness of the oxide layer on the surface of the steel sheet measured at any five locations may be taken to be the surface oxide layer thickness of the steel sheet. Here, regions where the oxide layer cannot be found due to scratches or the like on the surface of the steel sheet are excluded. If the surface oxide layer thickness differs greatly between the front and back sides of the steel sheet, the thickness of the oxide layer on the surface of the steel sheet is measured at any five locations on each of the front and back sides and the average value of the measured thicknesses is taken to be the surface oxide layer thickness of the steel sheet.

The surface oxide layer thickness of the steel sheet after welding, i.e. the base steel sheet included in the welded joint, is not limited. The thermal effect of welding may cause the surface oxide layer of the base steel sheet to be thicker than that of the steel sheet before welding. Moreover, depending on the environment in which the welded joint is stored and used after production, the surface oxide layer of the base steel sheet may thicken with the progress of corrosion, etc. The surface oxide layer thickness of the base steel sheet, however, does not particularly influence Ow, i.e. the oxygen content of the weld metal. Hence, the surface oxide layer thickness of the base steel sheet is not limited.

$$0 \leq \mathrm{Ti} + 100 \times \mathrm{B} \leq 12 - Og \times 0.8/100 \tag{4}$$

In order to prevent room-temperature brittle fracture of the weld portion, it is necessary to appropriately control the relationship between the oxygen content of the weld metal and the total area ratio of martensite and bainite in the weld metal, specifically, satisfy the foregoing formulas (1) to (3), as mentioned above. To do so, the surface oxide layer thickness of each of the steel sheets as the materials to be joined is set to 50 μm or less, and the relationship of formula (5) described below is satisfied. In addition, it is necessary to appropriately control the relationship between the sum of the Ti content and B content in each of the steel sheets as the materials to be joined and the total volume fraction of $CO_2$ and $O_2$ in the shielding gas used for welding, specifically, satisfy the foregoing formula (4). In formula (4), the upper limit is preferably 0.4+{−0.8+(t−0.8)×3/46}×(Og−100)/100. In formula (4), the lower limit is preferably 0.01.

If the chemical compositions of the two or more steel sheets as the materials to be joined are different from each other, the chemical composition of each of the steel sheets needs to satisfy formula (4).

$$1200 \times t_{all}^{1/3} \times \left(1 + 0.1 \times t_0^{1/5}\right) \leq Q \leq 4000 \times t_{all}^{1/3} \times \left(1 + 0.1 \times t_0^{1/5}\right), \tag{5}$$

In order to prevent room-temperature brittle fracture of the weld portion, it is necessary to appropriately control the relationship between the oxygen content of the weld metal and the total area ratio of martensite and bainite in the weld metal, specifically, satisfy the foregoing formulas (1) to (3). To do so, the surface oxide layer thickness of each of the steel sheets as the materials to be joined is set to 50 μm or less, and the relationship of the foregoing formula (4) is satisfied. In addition, it is necessary to optimize the heat input amount Q (J/cm) depending on the thickness of the materials to be joined and the surface oxide layer thickness of the steel sheets as the materials to be joined as in the foregoing formula (5).

In detail, if the heat input amount Q is excessively small, not only penetration is poor but also the cooling rate after welding increases and the total area ratio of martensite and bainite in the weld metal increases excessively. This is likely to cause a decrease in the room-temperature toughness of the weld metal. Moreover, the volume of the weld metal decreases, and the dilution of the oxygen incorporated into the weld metal is insufficient. This is also likely to cause a decrease in the room-temperature toughness of the weld metal. If the heat input amount Q is excessively large, burn through occurs and a sound welded joint cannot be obtained. In addition, a large amount of slag is generated, which may cause degradation in corrosion resistance. Hence, the heat input amount Q needs to be controlled to satisfy formula (5). In formula (5), the upper limit is preferably $3000\times_{tall}{}^{1/3}\times(1+0.1\times t_o{}^{1/5})$. In formula (5), the lower limit is preferably $1300\times t_{all}{}^{1/3}\times(1+0.1\times t_o{}^{1/5})$ In formula (5), $t_{all}$ is the thickness (mm) of the materials to be joined, and $t_o$ is the average value (μm) of the surface oxide layer thicknesses of the steel sheets.

In detail, in the case of a lap fillet welded joint, tall is the sum of the sheet thicknesses of the steel sheets as the materials to be joined. In the case of a butt welded joint or a bead-on-plate welded joint, tall is the sheet thickness of the thickest steel sheet of the steel sheets as the materials to be joined.

$t_o$ is the average value of the surface oxide layer thicknesses (per side) of the steel sheets as the materials to be joined.

The heat input amount Q is calculated by the following formula:

$$Q = I \times E \times 60/c$$

where I is the welding current (A), E is the arc voltage (V), and c is the welding speed (cm/min).

If the welding current, arc voltage, and/or welding speed changes during welding, the average value (time average value during welding ((time integral value)/(welding time))) is used to calculate the heat input amount Q.

Welding conditions other than those described above are not limited and may be in accordance with conventional methods.

For example, the type of shielding gas used for welding is not limited as long as the foregoing formula (4) is satisfied. Examples of the shielding gas include Ar, He, $CO_2$, $O_2$, $N_2$, and mixed gases thereof.

Examples of the filler metal that can be used include a solid wire, a flux cored wire, and a metal cored wire. In particular, it is preferable to use a solid wire from the viewpoint of controlling the oxygen content of the weld metal and the total area ratio of martensite and bainite in the weld metal to satisfy the foregoing formulas (1) to (3). For example, the chemical composition of the filler metal contains, in mass %, C: 0.03% to 0.2%, Si: 0.005% to 2.00%, Mn: 0.05% to 5.00%, P: 0.050% or less, S: 0.010% or less, Ti: 0% to 0.20%, Al: 0% to 0.30%, and O: 0% to 0.01%, and optionally contains, in mass %, one or more elements selected from Cr, Ni, Mo, W, V, B, Nb, Cu, and N in a total amount of 10% or less (in the case where any of these optionally added elements is contained, the total content thereof is preferably 0.01% or more), with the balance consisting of Fe and inevitable impurities.

Examples of the welding method include gas metal arc welding and laser-arc hybrid welding. As the welding method, gas metal arc welding, which is the wire welding method most commonly used in the automobile assembly process, is particularly suitable.

The current control method in gas metal arc welding is not limited, and for example, DC pulse welding in which the current is controlled in a pulsed form at a constant cycle may be used. Push-pull welding in which the weld wire is fed forward and backward at a constant cycle during welding, such as CMT welding, may also be used. The power supply characteristics of the welder are not limited. For example, the average welding current is preferably 100 A to 300 A, the average arc voltage is preferably 10 V to 30 V, and the welding speed is preferably 40 cm/min to 200 cm/min.

EXAMPLES

Figure 3:
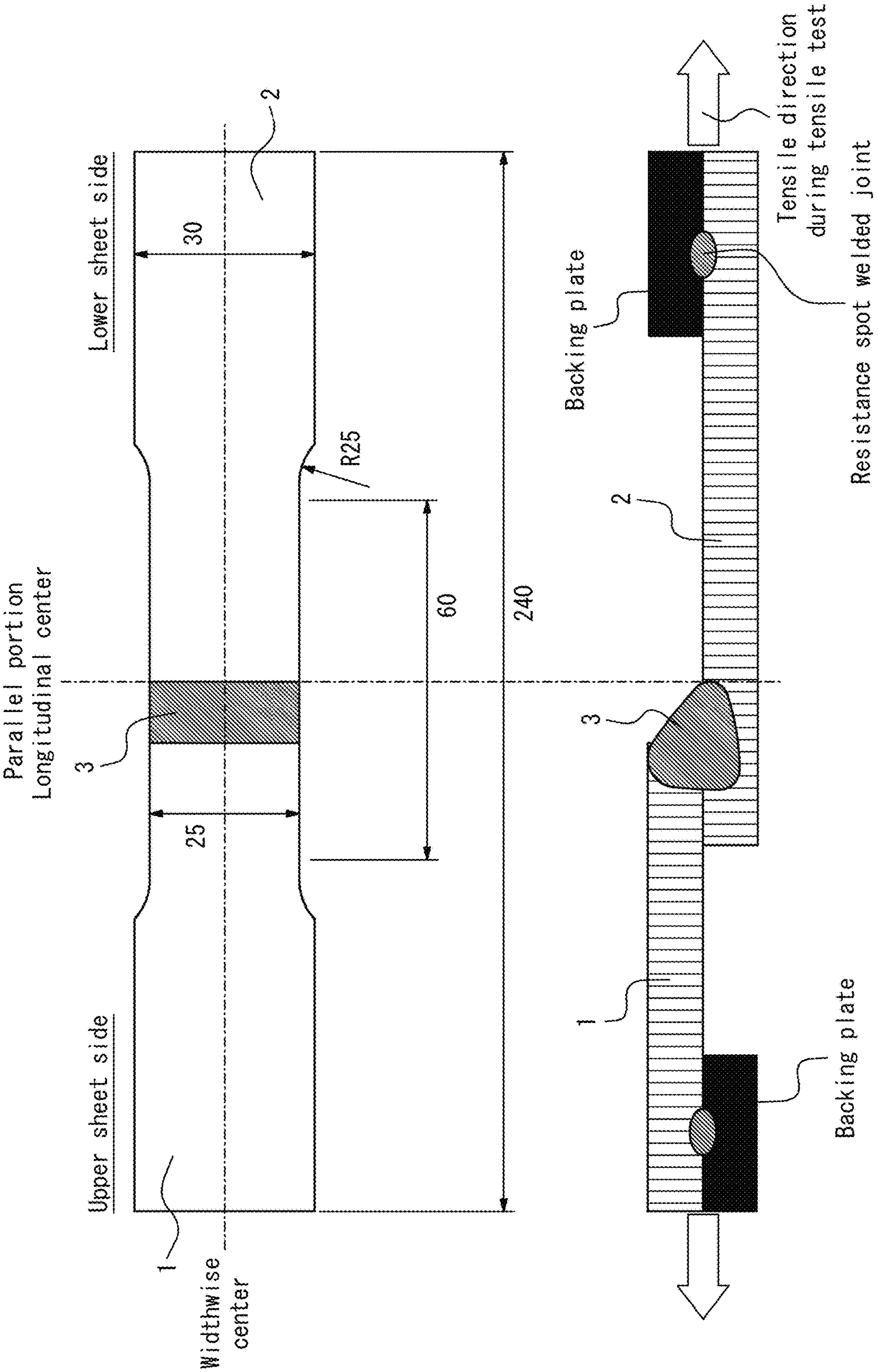
FIG. 3 is a diagram schematically illustrating an example of a tensile test piece for a lap fillet welded joint.
Figure 4:
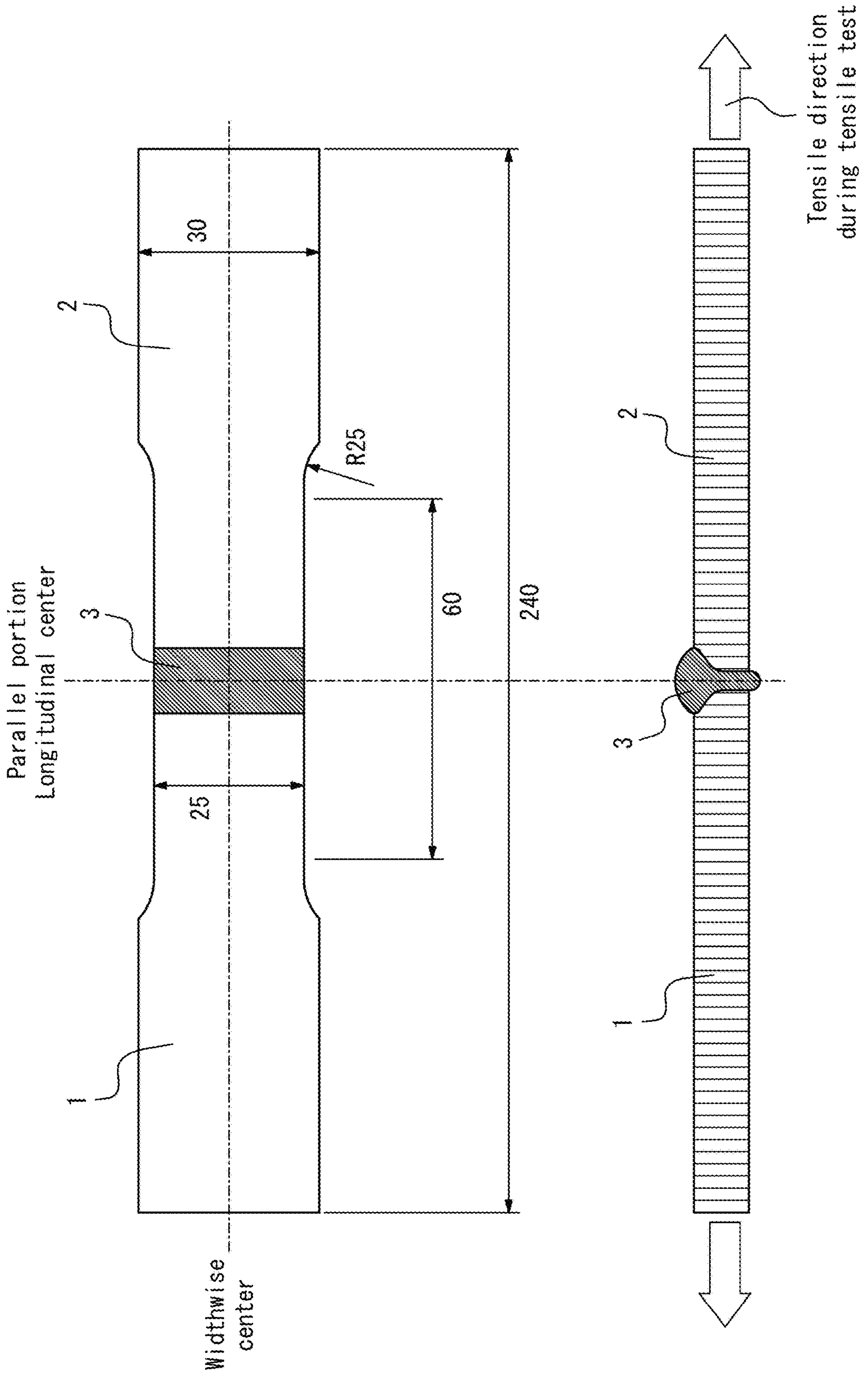
FIG. 4 is a diagram schematically illustrating an example of a tensile test piece for a butt welded joint.

Welded joints were produced each by welding, as materials to be joined, steel sheets 1 and 2 shown in Table 1 under the conditions shown in Table 2. The filler metal (weld wire) used was a solid wire (denoted by SW in Table 2) or flux cored wire (denoted by FCW in Table 2) having the chemical composition described above as an example. The joint type was a lap fillet welded joint or a butt welded joint. The positional relationship between steel sheets 1 and 2 is shown in FIGS. 3 and 4. Conditions other than those specified were in accordance with conventional methods. Steel sheets 1 and 2 both had the chemical composition described above as an example. The area ratio of the steel microstructure shown in Table 1 was measured in the above-described manner.

Next, a sample of 1 g to 10 g was taken from each produced welded joint, and the oxygen content Ow of the weld metal was measured by the inert gas fusion infrared absorption method. The total area ratio Mw of martensite and bainite in the weld metal was also measured in the above-described manner. The results are shown in Table 2. In the column of formula (4) in Table 2, the case where both steel sheets 1 and 2 as the materials to be joined satisfied formula (4) is indicated as "satisfied", and the case where at least one of steel sheets 1 and 2 as the materials to be joined did not satisfy formula (4) is indicated as "unsatisfied".

Figure 5:
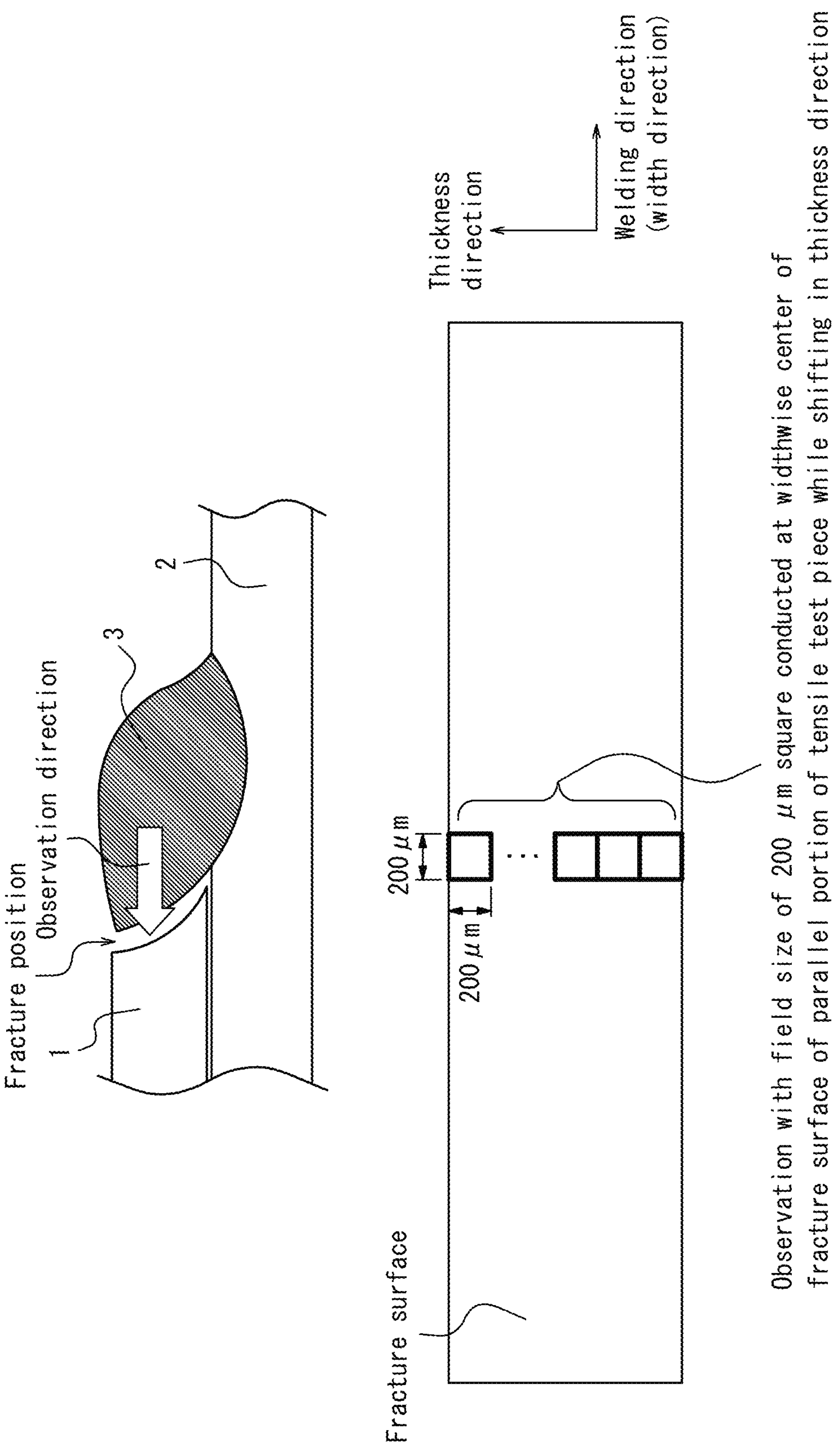
FIG. 5 is a schematic diagram explaining a method of evaluating room-temperature toughness.

Furthermore, a tensile test piece illustrated in FIG. 3 or 4 was taken from each produced welded joint so that a direction orthogonal to welding (a direction orthogonal to the welding direction (weld bead direction) and the thickness direction of the welded joint (the sheet thickness direction of the base steel sheets)) would be the longitudinal direction. In the case of a lap fillet welded joint, as illustrated in FIG. 3, a backing plate was joined to each base steel sheet by resistance spot welding. The taken tensile test piece was then subjected to a tensile test in accordance with JIS Z 2241 (2011). The tensile direction in the tensile test is illustrated in FIGS. 3 and 4, and the test speed was 10 mm/s. After the tensile test, the fracture surface of the tensile test piece was observed. Specifically, as illustrated in FIG. 5, observation with a field size of 200 μm square was conducted at the widthwise center of the fracture surface of the parallel portion of the tensile test piece while shifting in the thickness direction. The observation was conducted using a scanning electron microscope (SEM) with 500 magnification. For each observation field, if the area of the brittle fracture region was 50% or more of the area of the observation field, the observation field was determined to be a brittle fracture surface. A brittle fracture region is a region where the fracture surface form is cleavage fracture or quasicleavage fracture. Each region where dimples or traces of shear fracture were found was regarded not as a brittle fracture region but as a ductile fracture region. Room-temperature toughness was evaluated using Nb/Na based on the following criteria, where Na is the total number of observation fields and Nb is the number of observation fields determined to be a brittle fracture surface:

Rating A (excellent room-temperature toughness): $0 \le Nb/Na \le 0.2$

Rating B (good room-temperature toughness): $0.2 < Nb/Na \le 0.5$

Rating F (insufficient room-temperature toughness): $0.5 < Nb/Na \le 1.0$.

The evaluation results are shown in Table 2.

The sheet thicknesses, steel microstructures, and chemical compositions of the base steel sheets included in the obtained welded joint were the same as the sheet thicknesses, steel microstructures, and chemical compositions of the steel sheets as the materials to be joined, and accordingly their description is omitted here.

TABLE 1

| | Steel sheet 1 | | | | | | | | | | | | | |
|---|---|---|---|---|---|---|---|---|---|---|---|---|---|---|
| No. | Sheet thickness [mm] | Tensile strength [MPa] | Ti [mass %] | B [mass %] | Ti + 100 × B [mass %] | C [mass %] | Si [mass %] | Mn [mass %] | P [mass %] | S [mass %] | Al [mass %] | MB [%] | Surface oxide layer thickness [μm] | Metal coating layer |
| 1 | 2.9 | 1020 | 0.10 | 0.0020 | 0.30 | 0.08 | 0.70 | 1.80 | 0.020 | 0.001 | 0.0500 | 85 | 0.02 | None |
| 2 | 2.6 | 1240 | 0.02 | 0.0010 | 0.12 | 0.12 | 1.10 | 2.00 | 0.010 | 0.002 | 0.0300 | 82 | 15 | None |
| 3 | 2.0 | 1020 | 0.10 | 0.0020 | 0.30 | 0.05 | 0.50 | 2.30 | 0.030 | 0.002 | 0.0600 | 72 | 1 | GA |
| 4 | 2.0 | 1021 | 0.00 | 0.0000 | 0.00 | 0.20 | 0.80 | 2.20 | 0.002 | 0.001 | 0.0300 | 100 | 4 | None |

TABLE 1-continued

| | | | | | | | | | | | | | | |
|---|---|---|---|---|---|---|---|---|---|---|---|---|---|---|
| 5 | 2.9 | 1030 | 0.30 | 0.0100 | 1.30 | 0.15 | 1.50 | 1.70 | 0.010 | 0.001 | 0.3500 | 60 | 61 | None |
| 6 | 2.9 | 1260 | 0.20 | 0.0150 | 1.70 | 0.32 | 1.00 | 2.20 | 0.030 | 0.003 | 0.2000 | 95 | 0.02 | None |
| 7 | 2.6 | 1040 | 0.10 | 0.0080 | 0.90 | 0.10 | 0.90 | 1.50 | 0.010 | 0.001 | 0.0300 | 70 | 0.004 | None |
| 8 | 2.9 | 1025 | 0.18 | 0.0030 | 0.48 | 0.10 | 0.40 | 1.40 | 0.010 | 0.001 | 0.0600 | 80 | 0.1 | None |
| 9 | 0.8 | 1030 | 0.00 | 0.0020 | 0.20 | 0.18 | 0.80 | 2.10 | 0.020 | 0.001 | 0.0500 | 80 | 0.06 | None |
| 10 | 4.2 | 1030 | 0.01 | 0.0000 | 0.01 | 0.13 | 0.50 | 2.00 | 0.010 | 0.002 | 0.0500 | 82 | 11 | None |
| 11 | 3.5 | 1240 | 0.01 | 0.0105 | 1.06 | 0.20 | 0.05 | 2.40 | 0.010 | 0.002 | 0.0500 | 90 | 32 | GA |
| 12 | 2.4 | 820 | 0.20 | 0.0020 | 0.40 | 0.18 | 0.01 | 2.20 | 0.010 | 0.001 | 0.0500 | 82 | 45 | None |
| 13 | 3.4 | 1190 | 0.13 | 0.0020 | 0.33 | 0.22 | 1.70 | 1.90 | 0.020 | 0.001 | 0.0500 | 92 | 60 | None |
| 14 | 3.4 | 1260 | 0.30 | 0.0050 | 0.80 | 0.31 | 1.50 | 2.00 | 0.030 | 0.002 | 0.2000 | 88 | 0.02 | None |
| 15 | 3.2 | 1230 | 0.10 | 0.0020 | 0.30 | 0.18 | 1.60 | 3.00 | 0.030 | 0.003 | 0.0500 | 94 | 0.02 | None |
| 16 | 2.0 | 1560 | 0.00 | 0.0020 | 0.20 | 0.21 | 0.10 | 0.22 | 0.020 | 0.001 | 0.0300 | 98 | 0.01 | None |
| 17 | 1.6 | 1530 | 0.03 | 0.0020 | 0.23 | 0.19 | 1.30 | 2.60 | 0.005 | 0.001 | 0.0300 | 92 | 0.1 | GA |
| 18 | 1.6 | 1830 | 0.02 | 0.0025 | 0.27 | 0.31 | 0.20 | 1.10 | 0.010 | 0.001 | 0.0300 | 100 | 0.001 | None |
| 19 | 2.9 | 1030 | 0.01 | 0.0015 | 0.16 | 0.09 | 0.50 | 2.00 | 0.020 | 0.001 | 0.0300 | 85 | 0.02 | None |
| 20 | 2.6 | 1250 | 0.01 | 0.0025 | 0.26 | 0.13 | 1.10 | 1.60 | 0.010 | 0.002 | 0.0300 | 37 | 0.1 | None |

| | Steel sheet 2 | | | | | | | | | | | | | | | |
|---|---|---|---|---|---|---|---|---|---|---|---|---|---|---|---|---|
| No. | Sheet thick-ness [mm] | Tensile strength [MPa] | Ti [mass %] | B [mass %] | Ti + 100 × B [mass %] | C [mass %] | Si [mass %] | Mn [mass %] | P [mass %] | S [mass %] | Al [mass %] | MB [%] | Surface oxide layer thick-ness [μm] | Metal coating layer | $t_{all}$ [mm] | $t_0$ [mm] |
| 1 | 2.9 | 1020 | 0.10 | 0.0020 | 0.30 | 0.08 | 0.70 | 1.80 | 0.020 | 0.001 | 0.0500 | 85 | 0.01 | None | 5.8 | 0.015 |
| 2 | 2.6 | 1240 | 0.02 | 0.0010 | 0.12 | 0.12 | 1.10 | 2.00 | 0.010 | 0.002 | 0.0300 | 82 | 10 | None | 5.2 | 12.5 |
| 3 | 2.9 | 1020 | 0.10 | 0.0020 | 0.30 | 0.05 | 0.50 | 2.30 | 0.030 | 0.002 | 0.0600 | 72 | 1 | GA | 2.9 | 1 |
| 4 | 2.0 | 810 | 0.00 | 0.0000 | 0.00 | 0.20 | 0.80 | 2.20 | 0.002 | 0.001 | 0.0300 | 100 | 1 | None | 4.0 | 2.5 |
| 5 | 2.9 | 1030 | 0.30 | 0.0100 | 1.30 | 0.15 | 1.50 | 1.70 | 0.010 | 0.001 | 0.3500 | 60 | 57 | None | 5.8 | 59 |
| 6 | 2.9 | 1260 | 0.20 | 0.0150 | 1.70 | 0.32 | 1.00 | 2.20 | 0.030 | 0.003 | 0.2000 | 95 | 0.01 | None | 5.8 | 0.015 |
| 7 | 2.0 | 1260 | 0.04 | 0.0030 | 0.34 | 0.12 | 0.50 | 2.00 | 0.010 | 0.001 | 0.0400 | 95 | 0.005 | None | 4.6 | 0.0045 |
| 8 | 10.0 | 1020 | 0.02 | 0.0010 | 0.12 | 0.07 | 0.50 | 1.40 | 0.020 | 0.001 | 0.0300 | 75 | 5 | None | 12.9 | 2.55 |
| 9 | 1.4 | 1020 | 0.00 | 0.0020 | 0.20 | 0.18 | 0.80 | 1.60 | 0.010 | 0.001 | 0.0500 | 80 | 0.03 | None | 2.2 | 0.045 |
| 10 | 4.2 | 1020 | 0.01 | 0.0000 | 0.01 | 0.13 | 0.50 | 2.00 | 0.010 | 0.002 | 0.0500 | 82 | 0.02 | None | 8.4 | 5.51 |
| 11 | 3.5 | 1230 | 0.10 | 0.0020 | 0.30 | 0.20 | 0.05 | 1.50 | 0.010 | 0.010 | 0.0400 | 90 | 30 | GA | 7.0 | 31 |
| 12 | 2.6 | 1020 | 0.26 | 0.0022 | 0.48 | 0.18 | 0.01 | 2.20 | 0.010 | 0.001 | 0.0500 | 90 | 46 | None | 5.0 | 45.5 |
| 13 | 3.4 | 1190 | 0.13 | 0.0020 | 0.33 | 0.22 | 1.70 | 1.90 | 0.020 | 0.001 | 0.0500 | 92 | 60 | None | 6.8 | 60 |
| 14 | 3.4 | 1260 | 0.30 | 0.0050 | 0.80 | 0.31 | 1.50 | 2.00 | 0.030 | 0.002 | 0.2000 | 88 | 0.02 | None | 6.8 | 0.02 |
| 15 | 3.2 | 1230 | 0.10 | 0.0020 | 0.30 | 0.18 | 1.60 | 3.00 | 0.030 | 0.003 | 0.0500 | 94 | 0.02 | None | 6.4 | 0.02 |
| 16 | 2.0 | 1560 | 0.00 | 0.0020 | 0.20 | 0.21 | 0.10 | 0.22 | 0.020 | 0.001 | 0.0300 | 98 | 0.01 | None | 4.0 | 0.01 |
| 17 | 1.6 | 1530 | 0.03 | 0.0020 | 0.23 | 0.19 | 1.30 | 2.60 | 0.005 | 0.001 | 0.0300 | 92 | 0.1 | GA | 3.2 | 0.1 |
| 18 | 1.6 | 1830 | 0.02 | 0.0025 | 0.27 | 0.31 | 0.20 | 1.10 | 0.010 | 0.001 | 0.0300 | 100 | 0.001 | None | 3.2 | 0.001 |
| 19 | 2.9 | 1030 | 0.01 | 0.0015 | 0.16 | 0.09 | 0.50 | 2.00 | 0.020 | 0.001 | 0.0300 | 85 | 0.02 | None | 5.8 | 0.02 |
| 20 | 2.6 | 1250 | 0.01 | 0.0025 | 0.26 | 0.13 | 1.10 | 1.60 | 0.010 | 0.002 | 0.0300 | 87 | 0.1 | None | 5.2 | 0.1 |

MB: Total area ratio of martensite and bainite

TABLE 2

| | Shielding gas | | | | | Welding conditions | | | Heat input | |
|---|---|---|---|---|---|---|---|---|---|---|
| No. | Ar [vol %] | $CO_2$ [vol %] | $O_2$ [vol %] | Og [vol %] | Formula (4) | Welding current [A] | Arc voltage [V] | Welding speed [cm/min] | amount [J/cm] | Formula (5) |
| 1 | 80 | 20 | 0 | 20 | Satisfied | 230 | 22 | 75 | 4048 | Satisfied |
| 2 | 95 | 5 | 0 | 5 | Satisfied | 220 | 25 | 50 | 6600 | Satisfied |
| 3 | 80 | 20 | 0 | 20 | Satisfied | 200 | 18 | 55 | 3927 | Satisfied |
| 4 | 80 | 20 | 0 | 20 | Satisfied | 250 | 21 | 120 | 2625 | Satisfied |
| 5 | 0 | 100 | 0 | 100 | Unsatisfied | 210 | 24 | 80 | 3780 | Satisfied |
| 6 | 80 | 20 | 0 | 20 | Unsatisfied | 120 | 26 | 100 | 1872 | Unsatisfied |
| 7 | 80 | 20 | 0 | 20 | Satisfied | 240 | 26 | 130 | 2880 | Satisfied |
| 8 | 80 | 20 | 0 | 20 | Satisfied | 310 | 24 | 90 | 4960 | Satisfied |
| 9 | 80 | 20 | 0 | 20 | Satisfied | 120 | 24 | 100 | 1728 | Satisfied |
| 10 | 80 | 20 | 0 | 20 | Satisfied | 310 | 26 | 80 | 6045 | Satisfied |
| 11 | 85 | 15 | 0 | 15 | Satisfied | 200 | 22 | 70 | 3771 | Satisfied |
| 12 | 10 | 90 | 0 | 90 | Satisfied | 240 | 21 | 70 | 4320 | Satisfied |
| 13 | 0 | 100 | 0 | 100 | Satisfied | 290 | 28 | 100 | 4872 | Satisfied |
| 14 | 10 | 90 | 0 | 90 | Unsatisfied | 280 | 26 | 70 | 6240 | Satisfied |
| 15 | 10 | 90 | 0 | 90 | Satisfied | 150 | 25 | 100 | 2250 | Unsatisfied |
| 16 | 95 | 5 | 0 | 5 | Satisfied | 170 | 21 | 70 | 3060 | Satisfied |

TABLE 2-continued

| | | | | | | | | | | |
|---|---|---|---|---|---|---|---|---|---|---|
| 17 | 80 | 20 | 0 | 20 | Satisfied | 170 | 25 | 90 | 2833 | Satisfied |
| 18 | 80 | 20 | 0 | 20 | Satisfied | 180 | 24 | 60 | 4320 | Satisfied |
| 19 | 100 | 0 | 0 | 0 | Satisfied | 220 | 27 | 80 | 4455 | Satisfied |
| 20 | 100 | 0 | 0 | 0 | Satisfied | 200 | 24 | 60 | 4800 | Satisfied |

| | | | Weld metal | | | | | |
|---|---|---|---|---|---|---|---|---|
| No. | Filler metal | Joint type | Oxygen content Ow [ppm] | Mw [%] | Formula (1) | Formula (2) or (3) | Room-temperature toughness | Remarks |
| 1 | SW | Lap fillet | 250 | 20 | Satisfied | Satisfied | A | Example |
| 2 | SW | Lap fillet | 170 | 100 | Satisfied | Satisfied | A | Example |
| 3 | SW | Butt | 270 | 50 | Satisfied | Satisfied | A | Example |
| 4 | SW | Lap fillet | 280 | 40 | Satisfied | Satisfied | A | Example |
| 5 | FCW | Lap fillet | 620 | 30 | Unsatisfied | Satisfied | F | Comparative Example |
| 6 | SW | Lap fillet | 400 | 95 | Satisfied | Unsatisfied | F | Comparative Example |
| 7 | SW | Lap fillet | 300 | 80 | Satisfied | Satisfied | A | Example |
| 8 | SW | Lap fillet | 250 | 10 | Satisfied | Satisfied | A | Example |
| 9 | SW | Lap fillet | 250 | 60 | Satisfied | Satisfied | A | Example |
| 10 | SW | Lap fillet | 310 | 30 | Satisfied | Satisfied | A | Example |
| 11 | SW | Lap fillet | 400 | 90 | Satisfied | Satisfied | B | Example |
| 12 | SW | Lap fillet | 580 | 30 | Satisfied | Satisfied | B | Example |
| 13 | SW | Lap fillet | 610 | 40 | Unsatisfied | Satisfied | F | Comparative Example |
| 14 | SW | Lap fillet | 470 | 80 | Satisfied | Unsatisfied | F | Comparative Example |
| 15 | SW | Lap fillet | 490 | 95 | Satisfied | Unsatisfied | F | Comparative Example |
| 16 | SW | Lap fillet | 260 | 75 | Satisfied | Satisfied | A | Example |
| 17 | SW | Lap fillet | 220 | 70 | Satisfied | Satisfied | A | Example |
| 18 | SW | Lap fillet | 250 | 95 | Satisfied | Satisfied | A | Example |
| 19 | SW | Lap fillet | 160 | 80 | Satisfied | Satisfied | A | Example |
| 20 | SW | Lap fillet | 140 | 50 | Satisfied | Satisfied | A | Example |

As shown in Table 2, the welded joints of all Examples had excellent room-temperature toughness, whereas the welded joints of Comparative Examples did not have sufficient room-temperature toughness.

REFERENCE SIGNS LIST

1 steel sheet (base steel sheet)
2 steel sheet (base steel sheet)
3 weld portion (weld metal)

The invention claimed is:

1. A welded joint comprising:

two or more base steel sheets; and a weld portion joining the base steel sheets, wherein each of the base steel sheets has a sheet thickness of 0.8 mm or more and 2.9 mm or less, at least one of the base steel sheets has a steel microstructure in which a total area ratio of martensite and bainite is more than 50% and a tensile strength of 980 MPa or more, and an oxygen content of a weld metal in the weld portion and a total area ratio of martensite and bainite in the weld metal satisfy formulas (1) to (3):

$$10 \le Ow \le 600 \quad (1)$$

$$10-(Ow-10)/34 \le Mw \le 100 \text{ when } 10 \le Ow \le 350 \quad (2)$$

$$0 \le Mw \le 100-(Ow-350)\times 50/250 \text{ when } 350 < Ow \le 600, \quad (3)$$

where Ow is the oxygen content of the weld metal in mass ppm, and Mw is the total area ratio of martensite and bainite in the weld metal in %.

2. The welded joint according to claim 1, being a lap fillet welded joint.

3. The welded joint according to claim 1, wherein each of the base steel sheets has a chemical composition in which a Ti content is 0 mass % to 0.20 mass % and a B content is 0 mass % to 0.0100 mass %.

4. A production method for the welded joint according to claim 1, comprising welding two or more steel sheets as materials to be joined to obtain the welded joint, wherein each of the steel sheets has a sheet thickness of 0.8 mm or more and 2.9 mm or less, each of the steel sheets has a surface oxide layer thickness of 50 μm or less, at least one of the steel sheets has a steel microstructure in which a total area ratio of martensite and bainite is more than 50% and a tensile strength of 980 MPa or more, a total volume fraction of $CO_2$ and $O_2$ in a shielding gas used for the welding and a Ti content and B content in each of the steel sheets satisfy formula (4), and a heat input amount in the welding, a thickness of the materials to be joined, and an average value of surface oxide layer thicknesses of the steel sheets satisfy formula (5), $$0 \le Ti + 100\times B \le 12 - Og\times 0.8/100 \quad (4)$$

$$1200\times t_{all}^{1/3}\times(1+0.1\times t_0^{1/5}) \le Q \le 4000\times t_{all}^{1/3}\times(1+0.1\times t_0^{1/5}), \quad (5)$$

where Og is the total volume fraction of $CO_2$ and $O_2$ in the shielding gas in %, Ti is the Ti content in each of the steel sheets in mass %, B is the B content in each of the steel sheets in mass %, Q is the heat input amount in J/cm, tan is the thickness of the materials to be joined in mm, and to is the average value of the surface oxide layer thicknesses of the steel sheets in μm.

5. The production method according to claim 4, wherein a filler metal used for the welding is a solid wire.

6. The production method according to claim 4, wherein the welding is gas metal arc welding.

7. The welded joint according to claim 2, wherein each of the base steel sheets has a chemical composition in which a Ti content is 0 mass % to 0.20 mass % and a B content is 0 mass % to 0.0100 mass %.

8. The production method according to claim 5, wherein the welding is gas metal arc welding.

* * * * *